G. C. HAIGHT.
HARROW.
No. 173,404. Patented Feb. 15, 1876.
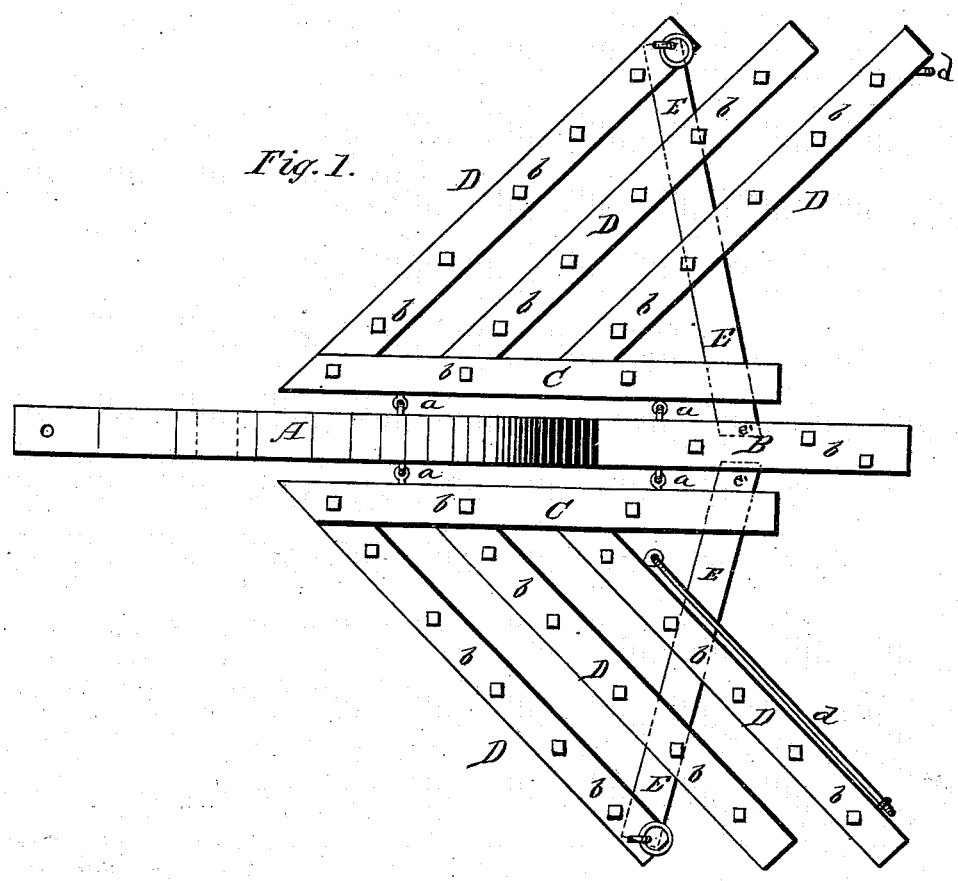
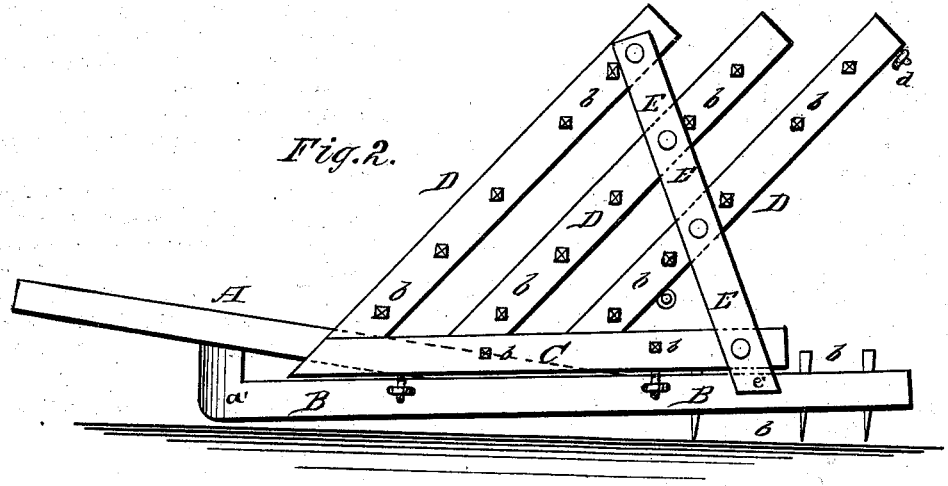

UNITED STATES PATENT OFFICE.

GEORGE C. HAIGHT, OF NEWARK, WISCONSIN.

IMPROVEMENT IN HARROWS.

Specification forming part of Letters Patent No. 173,404, dated February 15, 1876; application filed July 10, 1875.

*To all whom it may concern:*

Be it known that I, GEORGE C. HAIGHT, of Newark, in the county of Rock and State of Wisconsin, have invented certain new and useful Improvements in Harrows; and I do hereby declare that the following is a full, clear, and exact description thereof, which will enable others skilled in the art to which it pertains to make and use the same, reference being had to the accompanying drawing, and to the letters of reference marked thereon, which form a part of this specification.

The nature of my invention consists in the construction and arrangement of a harrow, as will be hereinafter more fully set forth.

In the annexed drawing, Figure 1 is a plan view of an implement embodying my invention; and Fig. 2 is a side elevation of the same, showing the wings turned up.

A represents the tongue, to which the team is to be hitched, and which is secured in an inclined position to a center bar, B, on the top thereof. On each side of the center bar B is attached a bar, C, by means of loops $a\,a$, or other suitable means, which will allow said side bars to turn freely up or down. From the outer side of each bar C project three parallel bars, D D, set at an angle with the bar C, as shown, and connected on their under sides by a brace, E, which is also secured on the under side of the bar C, and projects beyond the same so as to overlap the edge of the center bar B, and form a stop, $e'$, for the downward movement of the bars C and D. These bars or stops are so arranged that the two harrows can turn down only a certain distance below the horizontal plane of the center beam B. In the bars C and D are inserted rake-teeth $b\,b$, of any ordinary form, thus making, in fact, two separate and independent harrows flexibly connected to the center bar, by which means the harrows will accommodate themselves to any unevenness in the ground. When the harrow is not in use the two wings can be raised or partially folded and fastened together by a hoop, $d$. When thus folded the front end of the center bar B rests upon the ground, forming a shoe, to facilitate the moving of the harrow from place to place, as the bar B is slightly curved in front at $a'$, and the wings, when raised, throw the bar B upon the ground, thus forming a runner.

Having thus fully described my invention, what I claim as new, and desire to secure by Letters Patent, is—

The bar B, curved at $a'$, side bars C, parallel bars D, and braces E, projecting under the central bar, in combination with central bar B and hooks $d$, all constructed and arranged as and for the purpose specified.

In testimony that I claim the foregoing as my own I affix my signature in presence of two witnesses.

GEORGE C. HAIGHT.

Witnesses:
 E. P. KING,
 T. B. WILSON.